No. 855,149. PATENTED MAY 28, 1907.
B. A. VAUGHN & W. G. BISSELL.
ATTACHMENT FOR TRIPOD CAMERAS.
APPLICATION FILED OCT. 12, 1906.

Witnesses:—
R. J. Beall.
S. E. Thomas.

B. A. Vaughn,
W. G. Bissell.
Inventors, by—
John B. Thomas & Co.
Attorneys.

UNITED STATES PATENT OFFICE.

BENJAMIN A. VAUGHN AND WILLIAM G. BISSELL, OF CORNING, CALIFORNIA.

ATTACHMENT FOR TRIPOD-CAMERAS.

No. 855,149.      Specification of Letters Patent.      Patented May 28, 1907.

Application filed October 12, 1906. Serial No. 338,603.

*To all whom it may concern:*

Be it known that we, BENJAMIN A. VAUGHN and WILLIAM G. BISSELL, citizens of the United States, residing at Corning, in the county of Tehama and State of California, have invented an Attachment for Tripod-Cameras, of which the following is a full description.

This invention is an improvement in tripod-cameras, and relates more especially to an attachment for supporting the camera adjustably upon the tripod.

The primary object of the invention is to provide a simple and effective ball and socket joint for adjustably and detachably connecting a camera to its tripod or support, and in such manner that the said camera may be conveniently adjusted in any direction and to any reasonable extent so as to properly locate the picture on the ground glass or plate.

Other though minor objects of the invention will hereinafter appear in the specifications, and what we claim as new in the particular construction and combination of parts will be specifically set forth in the appended claims.

Figure 1:
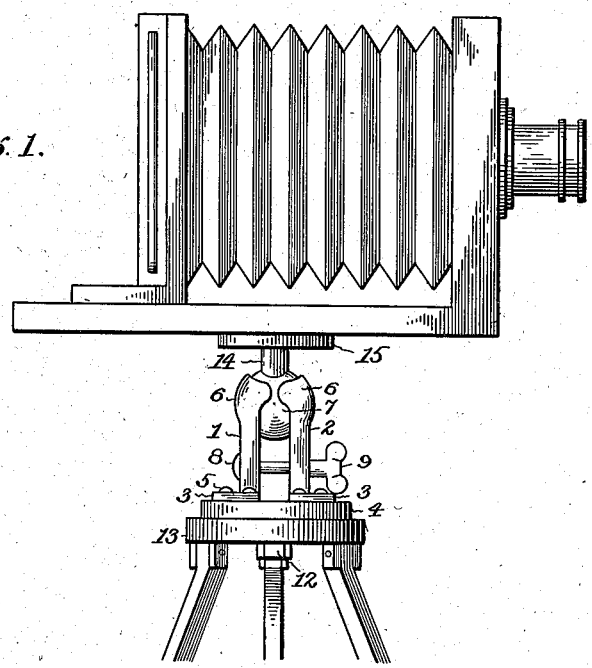
Figure 2:
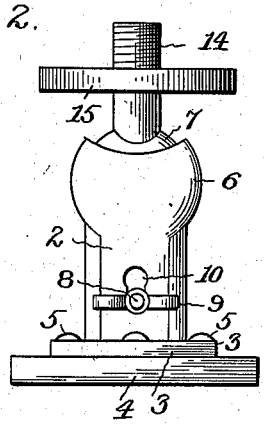
Figure 3:
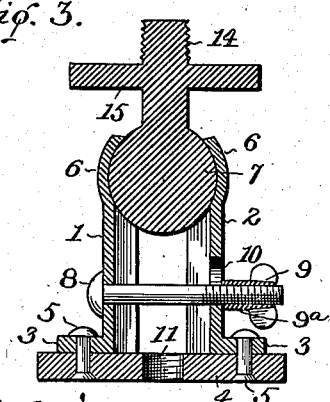

In the accompanying drawings, forming a part hereof: Figure 1 is a side elevation illustrating the application of our invention. Fig. 2 is an enlarged detail view of the attachment constituting our invention. Fig. 3 is a vertical sectional view thereof.

Like letters of reference indicate like parts in all the figures of the drawings.

In carrying out our invention we employ in the first place two spring-metal socket-plates 1 and 2, which are flanged at their lower ends, as at 3, to provide for securing them firmly to a base-plate 4, the connection in the present instance being by rivets 5, though other means of attachment may be employed. These socket-plates rise vertically from the base-plate and at their upper ends are bulged outward, or shaped concavo-convex, as at 6, to receive the other part of the attachment or device, comprising the ball 7 and its means of attachment.

The socket-plates are provided with a clamping means, comprising in the present instance a bolt 8, which passes transversely through said plates and receives a winged thumb-nut 9, the latter being preferably provided with a shank portion 9ª which bears against one of the socket-plates and is opposed to the head of the bolt, which latter bears against the other plate. The socket-plate which is contiguous to the thumb-nut may be and preferably is provided with a keyhole slot 10, through which the threaded end of the bolt passes, and with the narrower portion of which slot said bolt normally engages.

The socket portion of the device is attached to the tripod, for which purpose the base-plate thereof is provided with a threaded opening 11, into which the bolt 12 is threaded, the latter passing upward through the top-plate 13 of the tripod. The ball portion of the device is attached to the camera, and is therefore provided with a shank 14 threaded at its outer end to engage a correspondingly threaded opening in the base of the camera, said shank having a disk 15 for convenience in turning the same and which is adapted to form a bearing for the camera.

When the parts are attached they form a ball and socket joint between the camera and tripod, whereby the camera may be adjusted in any direction after the tripod or support has been set in position. In making an adjustment of the camera the thumb-nut is loosened only sufficiently to permit the ball to turn in the socket, and when the desired adjustment is made the parts are secured by tightening upon the thumb-nut. Inasmuch as the socket-plates are of considerable length and made of spring-metal the operation of the device may be made with ease and precision.

The removal of the camera from the tripod can be effected by unscrewing the bolt 12, after which the attachment or ball and socket device may be detached from the camera by unscrewing it therefrom. For the purpose of more quickly removing the camera from the tripod the slot 10 is provided in the socket-plate 2, and it will be noted that after loosening the thumb-nut and raising the threaded end of the bolt the ball may be withdrawn from between the plates, in which operation the shank 9ª of the nut will enter the larger portion of the slot and permit the plates to separate. In this instance the ball will remain on the camera and the socket on the tripod, and of course the parts can be quickly connected again by simply passing the ball into the socket, lowering the bolt and tightening the nut thereon.

It is customary to connect a camera and tripod by means of a bolt passed up through the top of the tripod into a threaded opening in the bottom of the camera. In applying our device to such a camera it is therefore not necessary to alter either the camera or the tripod, as the threaded end of the shank 14 will pass into the usual threaded hole in the bottom of the camera, while the bolt will perform its usual function in attaching the base-plate to the tripod.

The construction, operation and practical advantages of our invention will be readily understood from the foregoing description, and it will be apparent that we provide a device that can be conveniently applied and in use will permit the photographer to very quickly adjust his camera irrespective of the tripod.

Having described our invention, what we claim as new and desire to secure by Letters-Patent, is:

1. An attachment for tripod-cameras, comprising a pair of yielding socket-plates having ball receiving depressions at their upper ends and flanged at their lower ends, a base-plate rigidly secured to the flanged ends of the socket-plates connecting them permanently together, a clamping bolt passed transversely through the plates at a point between the flanges and depressions, a clamping nut threaded on the end of the bolt, and a ball having means of attachment to the camera and located between the plates in the depressions thereof, substantially as shown and described.

2. An attachment for tripod-cameras, comprising a pair of socket-plates having depressions to receive a ball and transverse bolt-apertures below said depressions, one of the bolt-apertures being in the form of a keyhole slot, a bolt passed through the bolt-apertures, and a nut threaded on the bolt and having a shank adapted to take into the larger portion of the keyhole slot; together with a ball adapted to be inserted between the plates into the depressions therein, said ball having means of attachment to the camera, substantially as shown and described.

In testimony whereof we have signed our names to this specification in the presence of two subscribing witnesses.

BENJAMIN A. VAUGHN.
WILLIAM G. BISSELL.

Witnesses:
W. D. NICHOLSON,
M. CHENOWETH.